United States Patent
Crespo et al.

(10) Patent No.: US 6,424,378 B1
(45) Date of Patent: Jul. 23, 2002

(54) METHOD FOR THE ACQUISTION OF DATA FROM A VIDEO SIGNAL

(75) Inventors: Thierry Crespo, Trets (FR); Alberto Perego, Carugate Milano (IT)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/291,363

(22) Filed: Apr. 14, 1999

(30) Foreign Application Priority Data

Apr. 15, 1998 (FR) .............................. 98 04987

(51) Int. Cl.$^7$ ............................ H04N 7/04; H04N 7/08; H04N 7/087
(52) U.S. Cl. ........................................ 348/465; 348/468
(58) Field of Search .................................. 348/465, 468, 348/478, 718, 719; 725/135, 136, 137, 138, 139, 140, 141, 142; H04N 7/087, 7/04, 7/08

(56) References Cited

U.S. PATENT DOCUMENTS

| | | | | | |
|---|---|---|---|---|---|
| 4,439,760 A | * | 3/1984 | Fleming | ...................... | 345/520 |
| 4,679,083 A | * | 7/1987 | Schmitz et al. | ............. | 358/147 |
| 4,701,794 A | | 10/1987 | Froling et al. | | |
| 5,184,220 A | * | 2/1993 | Kinghorn et al. | ........... | 358/147 |
| 5,208,671 A | * | 5/1993 | Tarrant | ...................... | 348/465 |
| 5,373,324 A | * | 12/1994 | Kuroda et al. | ............. | 348/468 |
| 5,374,961 A | * | 12/1994 | Jung | .......................... | 348/468 |
| 5,430,491 A | * | 7/1995 | Park | .......................... | 348/468 |
| 5,635,987 A | * | 6/1997 | Park et al. | .................. | 348/468 |
| 5,659,759 A | * | 8/1997 | Yamada | ...................... | 395/738 |
| 5,757,414 A | * | 5/1998 | Thorne | ...................... | 348/468 |
| 5,835,153 A | * | 11/1998 | Pratt et al. | .................. | 348/468 |
| 5,852,471 A | * | 12/1998 | Furuya et al. | ............. | 348/465 |
| 5,913,009 A | * | 6/1999 | Kuboji et al. | ................ | 386/68 |
| 6,057,813 A | * | 5/2000 | Matsumoto | .................. | 345/26 |

FOREIGN PATENT DOCUMENTS

EP 0 591 880 A3 2/1993
EP 0 781 043 A2 11/1996

OTHER PUBLICATIONS

Fink, "Tausend Videotextseiten im Speicher", Oct. 30, 1992 No. 23, pp. 110–115. (No translation).

* cited by examiner

Primary Examiner—John W. Miller
Assistant Examiner—Brian P. Yenke
(74) Attorney, Agent, or Firm—Lisa K. Jorgenson; Allen, Dyer, Doppelt, Milbrath & Gilchrist, P.A.

(57) ABSTRACT

In a method of teletext management, the data processing is separated into at least two tasks. A first task deals with the processing of the data from the rough extraction, and a second task carries out the rest of the data processing. The first task activates the second task by an interrupt with a priority lower than an interrupt activating the first task. The method thus enables the interruption of the second task to carry out a following first task, thus eliminating any timing drift that may cause the loss of the data packet coming from the rough extraction.

22 Claims, 2 Drawing Sheets

METHOD FOR THE ACQUISTION OF DATA FROM A VIDEO SIGNAL

FIELD OF THE INVENTION

The invention relates to the field of signal processors, and, more particularly, to a video signal processor.

BACKGROUND OF THE INVENTION

Analog video signals are divided into frames and lines. Each frame corresponds to an image and each line corresponds to a horizontal scanning of a television screen. Conventionally, the frames include a number of lines that are greater than the number of lines of the screen. In SECAM, for example, only 525 lines are used for a screen image out of 625 lines transmitted. The lines unused for the transmission of television images are used firstly, for synchronization, and secondly, for data transmission. Among the data transmitted, there are known data elements relating to teletext systems.

Teletext data elements are placed at the beginning of each frame on a few lines. These data elements are structured in numbered pages. Each page represents about 1 k of data elements in text format.

For transmission, the pages are subdivided into several pieces and encoded. Despite the compression of the pages, a single page is transmitted in pieces over several frames. In addition to the page data elements, additional communication and management data elements are transmitted. Depending on the different standards used, which are known as "basic", "FLOF" and "TOP", the processing of the data elements and the management of the pages may be more or less important. The total pages transmitted is commonly hundreds of pages. The full sequence of teletext pages may be transmitted within a few minutes.

In the basic standard, the management data elements are limited to the numbers of each page so that a user can address them. In the FLOF standard, the management data elements associated with each page are the number of the page and other numbers corresponding to other pages which form links enabling the pages to be changed at higher speed for the user. In the TOP standard, the management data elements include a number of the page and of the tables of links with several levels forming a tree structure.

The first television receivers fitted with these systems were unable to function, except under the basic standard, and were able to store only the current page. The teletext system was relatively slow for the user, who had to wait until the page he wanted had been transmitted before being able to view it. In a first improvement, the television receivers were provided with a memory, e.g., an 8 k size memory, to store a few pages. As the television receiver stores the successive pages up to the current page, the user was able to make the pages scroll one after the other without having to systematically wait for the transmission of the desired page, provided that all the pages were read in succession.

The FLOF standard improves the comfort of the user because it enables the television receiver to store subsequent pages, and pages corresponding to the links. Thus, a contents page or a page referring to distant pages enables the user to carry out a page change that is not successive and faster. One problem of the FLOF standard lies firstly, in the waiting period needed when the user makes two successive page skips at high speed, and secondly, in the time needed to return to a contents page when a wrong choice has been made if the contents page has already been overwritten by another one.

The TOP standard enables these problems to be overcome. This is because the management data elements include rising and descending tree structures. The television receiver may then store one or two pages that refer to the current pages, a few following pages, and the pages to which the current page refers. Furthermore, as soon as a page skip is done, the pages to which the current page refers are already known by the television receiver. This makes it possible to anticipate loading of a new page.

The management of teletext systems is presently done in advanced television receivers by specialized circuits which deal only with teletext. These specialized circuits are large-sized and therefore cost a great deal. To integrate the a management of teletext in less sophisticated television receivers, it is necessary to reduce the cost of thee components dedicated to teletext. Present day television receivers include all the microcontroller type circuits using at least one processor. Those skilled in the art have had the idea of integrating a circuit into the microcontroller, with this circuit being dedicated to the extraction of teletext data elements from the video signal.

To reduce the size of the resulting microcontroller, only one circuit performing a rough In extraction of the video signal is integrated. Microcontrollers of this kind are known in the prior art. FIG. 1 gives an exemplary view of the internal diagram of a circuit marketed under the reference ST92R195 by STMicroelectronics S.A. which is the assignee of the present invention. This circuit integrates a rough extraction circuit. The term rough extraction should be understood to mean only the demodulation of the data elements and the storage of the data elements just after demodulation. For further details of the operation of the circuit or its implementation, those skilled in the art may refer to the datasheet for this circuit. This datasheet has been available to the public since November 1997 through STMicroelectronics S.A., and is entitled "ST92R195 8-bits MCU DATASHEET." Those skilled in the art may also refer to the literature on other circuits of the same family which are referenced as ST92195, ST92T195 and ST92E195.

Microcontrollers then manage the total teletext system in addition to the total function of the television receiver. It may appear to be a simple matter to program a processor for all these tasks. However, in the field of television receivers, it is extremely costly to use microcontrollers operating at high clock frequencies. A high clock frequency creates an additional noise source which is undesirable. A problem then arises in carrying out both the management of the television receiver and the management of the teletext system with one processor whose processing speed is limited.

FIG. 2 shows timing diagrams firstly, of the rough extraction 201, and secondly, of the tasks of the processor 202 in the case where the teletext is managed at the same level as the management of the television receiver. The timing diagram of the rough extraction 201 shows the instants of extraction 203 which are cyclical with a period T corresponding to the duration of a frame, which is typically 20 ms or 16.6 ms depending on the format of the country implemented therein. The timing diagram of the tasks 202 shows the time-sharing between the different tasks processed by the processor of the microcontroller. The different tasks are herein separated into two types of tasks, namely tasks 204 related to the management of the television receiver and tasks 205 related to the management of the teletext system.

The management of the different tasks 204 as well as the management of the teletext 205 are variable in duration. Consequently, there is a timing drift that may cause a loss of information. FIG. 1 shows a case of a loss where the new data elements extracted replace the data elements previously extracted during the processing of the previously extracted data elements. This results in a loss of data which requires a wait for the lost data elements to be repeated when they are repeated during the next transmission, which may typically be many minutes later. Those skilled in the art realize that it is possible to use an interrupt that corresponds to the beginning of the image, namely, to the end of the rough extraction of the data. An operation of this kind is shown in FIG. 3.

FIG. 3 shows timing. diagrams firstly, of the rough extraction 301, and secondly, of the tasks 302 of the processor. The rough extraction timing diagram 301 shows the instants of extraction 303 which are cyclical with a period T corresponding to the duration of a frame, which it typically 20 ms or 16.6 ms depending on the format of the country implemented therein. The timing diagram of the tasks 302 shows the time-sharing of different tasks processed by the processor of the microcontroller. The different tasks are separated into two types of tasks. Namely tasks related to the management of the television receiver TTV, and those related to the management of the teletext TTXT. Each management task of the teletext TTXT is activated by an end of a vertical blanking interval interrupt or EOVBIT.

A problem may arise when a teletext system is provided in the TOP standard, because the processing of a data packet may last more than the time interval between two data packets. The interrupt EOVBIT is then placed on standby and processed after the processing of the data packet which is under processing. A timing drift may occur and cause a loss of data. This is due to the lengthy processing needed for the management of the tree structure. However, it is also possible that the programs coming from interrupts having higher priority than the teletext system will slow down the processing. This may also prompt a loss of information in the FLOF standard.

SUMMARY OF THE INVENTION

An object of the invention is to provide a teletext management method that overcomes the above-mentioned problems. The method separates the processing of data into at least two tasks. A first task deals with the processing of the data elements from the rough extraction, and a second task deals with the rest of the processing. The first task activates the second task by a software interrupt with a lower priority than the end of a vertical blanking interval interrupt in such a way that a next end of a vertical blanking interval interrupt may interrupt the second task to obtain a next first task. Thus, there is no longer any temporal or timing drift that might cause a loss in the data packet from the rough extraction.

Another object of the invention is to provide a method for the acquisition and display of data elements from a video signal received by a television receiver including a processor. The processor receives a first interrupt when the data elements have been extracted from the video signal and stored in a buffer memory. The first interrupt activates a first processing operation for processing the data elements to decode, select and transfer the data elements into a useful memory. The end of the first processing operation produces a second interrupt with a lower priority than the first interrupt. The second interrupt activates a second processing operation for displaying the data elements on a screen and then updating a database used during the first processing operation.

More generally, the invention relates to a method for the management of a television receiver including a microcontroller that includes a processor and peripherals pertaining to the overall function of the television receiver, wherein the processor carries out the management of all the peripherals of the television receiver. The method preferably further includes acquiring and displaying data elements from the video signal received by the television receiver.

BRIEF DESCRIPTION OF THE DRAWINGS

The invention will be understood more clearly and other particular features and advantages shall appear from the following description, made with reference to the appended drawings, of which.

DETAILED DESCRIPTION OF THE PREFERRED EMBODIMENTS

Figure 1:
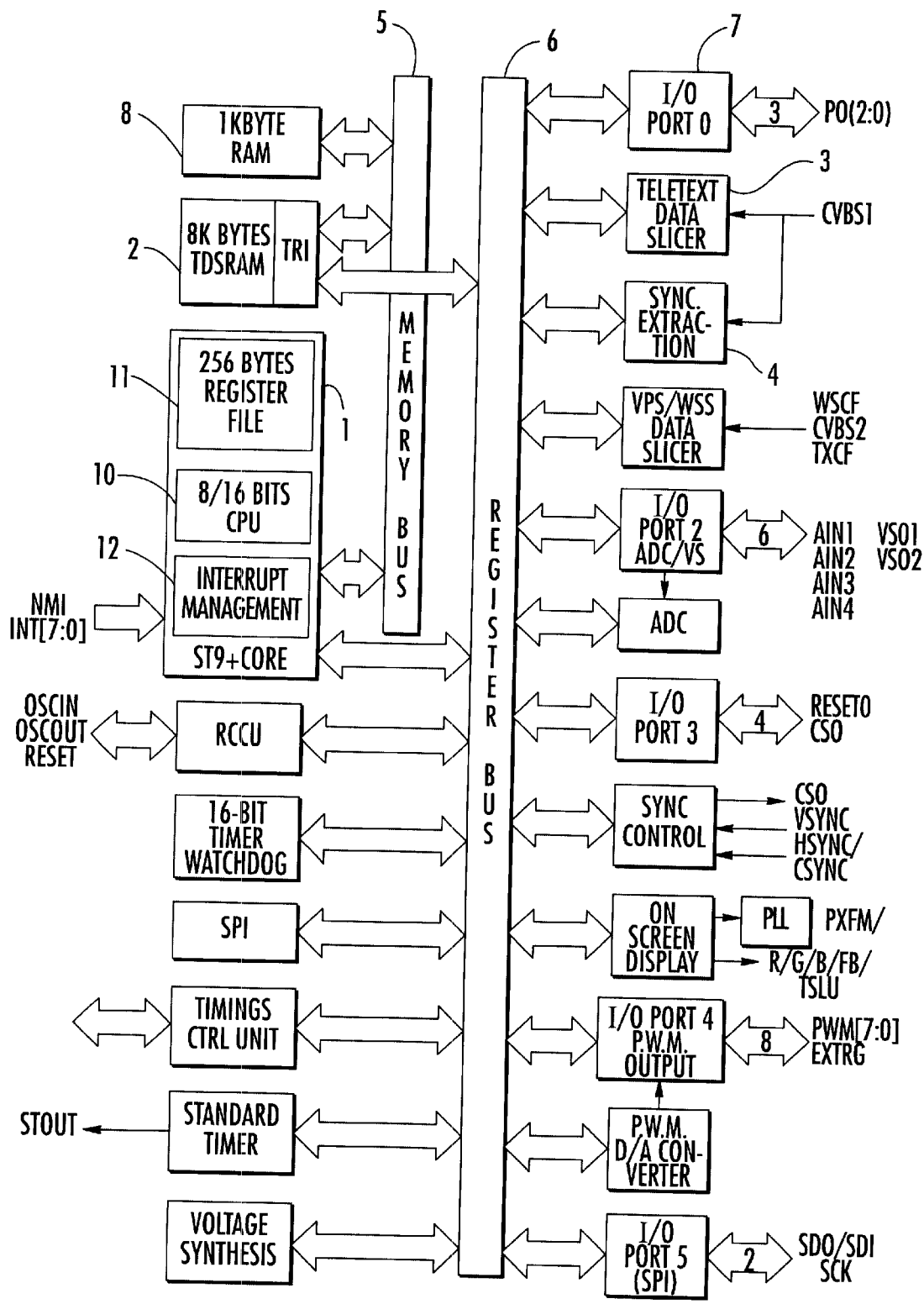
FIG. 1 shows a microcontroller according to the prior art.
Figure 2:
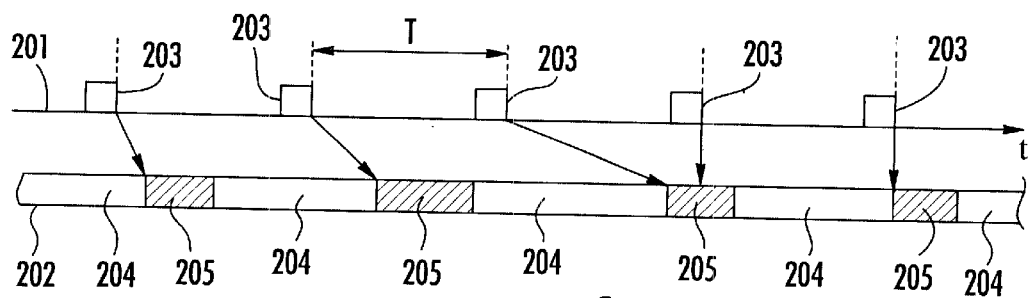
FIGS. 2 and 3 respectively show timing diagrams of task management according to the prior art.
Figure 3:
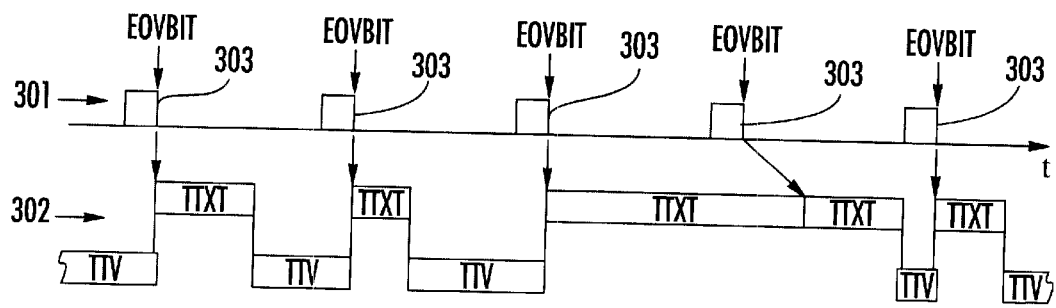

As stated above, FIG. 1 shows a microcontroller for television receivers according to the prior art. This microcontroller, which is marketed by STMicroelectronics S.A. under the reference ST92R195, is not described in full detail. For further details, reference is directed to the publication "ST92R195 8-bits MCU DATASHEET," which is incorporated herein by reference. The microcontroller of FIG. 1 has a processor core 1, a dual-port memory 2, a rough extraction circuit 3, a synchronization extraction circuit 4, first and second communications buses 5 and 6, a program memory 8 and at least one communications port 7. The processor core has a processor 10, a register bank 11 and an interrupt management circuit 12.

The processor core 1 and the dual-port memory 2 are both connected to the first and second buses 5 and 6. The first bus and the second bus each form a complete bus that includes the functions of data, address and control buses. The processor core 1 furthermore receives interrupt wires NMI and INT[7:0] coming from peripherals external to the microcontroller. The rough extraction circuit 3, the synchronization extraction circuit 4 and the communications port 7 are all connected to the second bus 6. The program memory 8 is connected to the first bus. The rough extraction circuit 3 and the synchronization extraction circuit 4 each receive a video signal CVBS1 external from the microcontroller. The communications port 7 has at least one output wire to send a signal external to the microcontroller.

When the processor core 1 receives an interrupt, either from one of the buses 5, 6 or from the interrupt wires NMI and INT[7:0] or from the processor 10, the interrupt management circuit 12 verifies that the interrupt received has a priority level higher than or lower than the priority level of the task in progress in the processor 10. If the interrupt has a lower level or a level equal to that of the task in progress, the interrupt management circuit 12 places the interrupt in a pending state. If, on the other hand, the interrupt received has a priority level higher than that of the task being performed, then the processor 10 is stopped. The contents of the internal registers of the processor 10 are stored in the register bank 11 and the processor 10 will seek a program corresponding to the interrupt received.

The interrupt may come either from one of the internal or external peripherals of the microcontroller, or it may be a software interrupt created by the running of a program in the processor 10. The interrupt management circuit 12 has a table enabling it to determine the different priorities between the interrupts and enabling a program address to be associated with each interruption. The interrupts are used in a television receiver for many accessories such as a remote control, a keyboard, control of the quality of the sound and image, etc. An interrupt at the beginning of the image is also produced by the synchronization extraction circuit 4.

Figure 4:
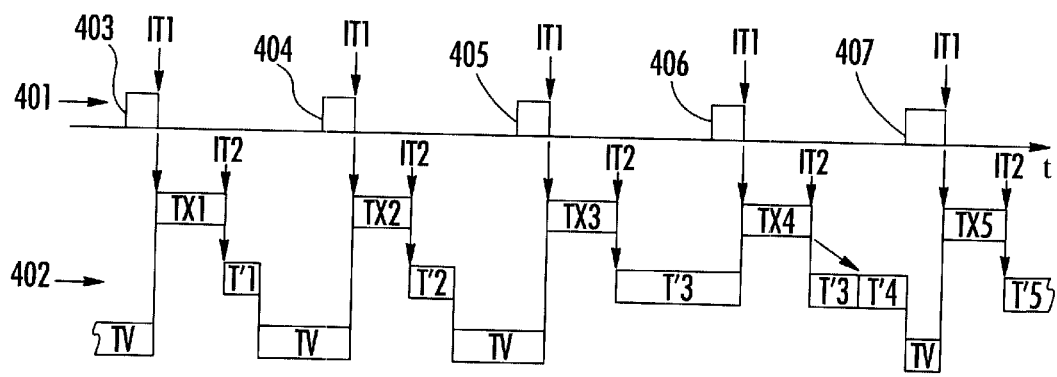
FIG. 4 shows a timing diagram of task management according to the present invention.

FIG. 4 shows timing diagrams firstly, of the rough extraction 401, and secondly, of the tasks of the processor 402. The rough extraction timing diagram 401 shows the extraction instants 403–407 which are cyclical with a period T corresponding to the duration of a frame, which may be 20 ms or 16.6 ms depending on the format of the country implemented therein. The timing diagram of the tasks 402 shows the time-sharing between the different tasks carried out by the processor 10 of the microcontroller.

The rough extraction circuit 3 carries out a rough extraction of the data elements from the video signal CVBS1. The rough extraction includes the demodulation of the teletext data elements present in the video signal and the storage of a data packet in a zone of the dual-port memory 2, with the zone acting as a buffer memory. It is also possible to use an additional memory. This extraction is done automatically by the second bus 6 without any interruption of the processor 10 which may perform another task. At the end of the rough extraction, a first interrupt referenced IT1, corresponding to the end of the vertical blanking interval interrupt is produced. The first interrupt IT1, if it has priority over the task in progress, activates a first processing operation referenced TX1–TX5.

The first processing operation TX1–TX5 includes the performance of all the operations that require the presence of the data packet in the buffer memory zone. The operations to be performed are data decoding operations, i.e., Hamming type error correction code with additional parity control. Then the identification of the data elements and storage in a useful zone of the working memory 2 if the data elements are identified as being useful data elements. The first processing operation ends with the production of a second interrupt IT2 with a priority lower than that of the first interrupt IT1.

The second interrupt IT2 activates a second processing operation T'1–T'5. The second processing operation enables the performance of all the teletext operations that are based on the useful data. Namely, page display and the updating of the different management tables for the teletext. When the second processing operation has ended, the processor can resume a task with a priority lower than that of the second processing operation. For example, a general task for the management of the television receiver referenced TV.

With a teletext management method of this kind, if a second processing operation T'3 is particularly lengthy, then it may be interrupted by a first interrupt IT1 to enable the performance of a new first processing operation TX4. At the end of the new first processing operation TX4, the second processing operation T'3 is resumed. The second interrupt IT2 produced by the new first processing operation TX4 is put in a pending state. The new second processing operation T'4 begins after the end of the second processing operation T'3.

The invention is particularly useful because there are interrupts that have priority over teletext. Priority interrupts include interrupts corresponding to the control keyboard, remote control and the internal clock of the television receiver. Action initiated by the remote control may result in a sequence of very short interrupts which considerably lengthen the first and second processing operations during a time interval which may be greater than the time between two frames.

In general, it is preferred that the first and second interrupts IT1 and IT2 should have successive priorities. The priority of the second interruption IT2 is immediately lower the priority of the first interruption IT1. To enable the most efficient operation possible, it is appropriate that these first and second interrupts IT1 and IT2 should have priority over the lengthy tasks. The term "lengthy tasks" must be understood to mean tasks that may have a duration of over 1 millisecond.

With regard to the second interrupt IT2, it may be a software interruption produced by the processor 10. However, it is possible that certain microcontrollers will be unable to make software interrupts having a priority higher than that of an external interrupt. One variation includes emulating the second interruption by using a communications port, such as port 7, with the communications port being connected external the microcontroller to one of the interrupt inputs NMI and INT[7:0].

The invention is particularly useful because there are interrupts that have priority over teletext. Priority interrupts include interrupts corresponding to the control keyboard, remote control and the internal clock of the television receiver. Action initiated by the remote control may result in a sequence of very short interrupts which considerably lengthens the first and second processing operations during a time interval which may be greater than the time between two frames.

That which is claimed:

1. A method for acquiring and displaying data elements from a video signal received by a television receiver comprising a processor, the method comprising the steps of:
   extracting the data elements from the video signal, with the extraction being periodically performed corresponding to frames of the video signal;
   periodically providing a first interrupt to the processor at an end of each frame after the data elements have been extracted from the video signal and stored in a buffer memory;
   activating a first processing operation responsive to each first interrupt, the first processing operation for processing the data elements for at least one of decoding, selecting and transferring the data elements to a memory within a next frame following the frame providing the first interrupt;
   generating a second interrupt with a lower priority than the first interrupt at an end of each first processing operation within the same next frame following the frame providing the first interrupt;
   activating a second processing operation responsive to each second interrupt for displaying the data elements on a display and updating a database used during the first processing operation within the same next frame following the frame providing the first interrupt.

2. A method according to claim 1, wherein the first interrupt has a priority lower than that of interrupts corresponding to processing operations having a duration less than about 1 millisecond.

3. A method according to claim 1, wherein the first and second interrupts have consecutive priority.

4. A method according to claim 1, wherein the data elements comprise teletext data elements.

5. A method for managing a television receiver comprising a microcontroller including a processor and peripherals pertaining to an overall operation of the television receiver, the processor carrying out management of the peripherals, the method comprising the steps of:

extracting data elements from a video signal received by the television receiver, with the extraction being periodically performed corresponding to frames of the video signal;

periodically providing a first interrupt to the processor at an end of each frame after the data elements have been extracted from the video signal and stored in a buffer memory;

activating a first processing operation responsive to the first interrupt, the first processing operation for processing the data elements for at least one of decoding, selecting and transferring the data elements to a memory within a next frame following the frame providing the first interrupt;

generating a second interrupt with a lower priority than the first interrupt at an end of each first processing operation within the same next frame following the frame providing the first interrupt;

activating a second processing operation responsive to each second interrupt for displaying the data elements on a display and updating a database used during the first processing operation within the same next frame following the first interrupt.

6. A method according to claim 5, wherein the first interrupt has a priority lower than that of interrupts corresponding to processing operations having a duration less than about 1 millisecond.

7. A method according to claim 5, wherein the first and second interrupts have consecutive priority.

8. A method according to claim 5, wherein the data elements comprise teletext data elements.

9. A method for managing a television receiver comprising a microcontroller including a processor and peripherals pertaining to an overall operation of the television receiver, the processor carrying out management of the peripherals, the method comprising the steps of:

extracting data elements from a video signal received by the television receiver, with the extraction being periodically performed corresponding to frames of the video signal;

periodically providing a first interrupt to the processor at an end of each frame after the data elements have been extracted from the video signal and stored in a buffer memory;

activating a first processing operation responsive to the first interrupt within a next frame following the frame providing the first interrupt;

generating a second interrupt with a lower priority than the first interrupt at an end of each first processing operation within the same next frame following the frame providing the first interrupt, the first and second interrupts having consecutive priority;

activating a second processing operation responsive to each second interrupt for displaying the data elements on a display and updating a database used during the first processing operation within the same next frame following the frame providing the first interrupt.

10. A method according to claim 9, wherein the first processing operation comprises processing the data elements for at least one of decoding, selecting and transferring the data elements to a memory.

11. A method according to claim 9, wherein the first interrupt has a priority lower than that of interrupts corresponding to processing operations having a duration less than about 1 millisecond.

12. A method according to claim 9, wherein the data elements comprise teletext data elements.

13. A video signal receiver comprising:

a processor and a memory, at least one peripheral, and a display;

said processor carrying out management of said at least one peripheral by extracting data elements from a received video signal, with the extraction being periodically performed corresponding to frames of the video signal, periodically providing a first interrupt to said processor at an end of each frame after the data elements have been extracted from the video signal and stored in a buffer memory, activating a first processing operation responsive to the first interrupt within a next frame following the frame providing the first interrupt, generating a second interrupt with a lower priority than the first interrupt at an end of each first processing operation within the same next frame following the first interrupt, activating a second processing operation responsive to each second interrupt for displaying the data elements on said display and updating a database used during the first processing operation within the same next frame following the first interrupt.

14. A video signal receiver according to claim 13, wherein the first processing operation processes the data elements for at least one of decoding, selecting and transferring the data elements to said memory.

15. A video signal receiver according to claim 13, wherein the first interrupt has a priority lower than that of interrupts corresponding to processing operations having a duration less than about 1 millisecond.

16. A video signal receiver according to claim 13, wherein the first and second interrupts have consecutive priority.

17. A video signal receiver according to claim 13, wherein the data elements comprises teletext data elements.

18. A video signal receiver comprising:

a processor and a memory, at least one peripheral, and a display;

said processor carrying out management of said at least one peripheral by extracting data elements from a video signal received by said video signal receiver, with the extraction being periodically performed corresponding to frames of the video signal, periodically providing a first interrupt to said processor at an end of each frame after the data elements have been extracted from the video signal and stored in a buffer memory, activating a first processing operation responsive to the first interrupt, the first processing operation for processing the data elements for decoding, selecting and transferring the data elements to said memory within a next frame following the frame providing the first interrupt, generating a second interrupt with a lower priority than the first interrupt at an end of each first processing operation within the same next frame following the frame providing the first interrupt, activating a second processing operation responsive to each second interrupt for displaying the data elements on said display during the second processing operation within the same next frame following the frame providing the first interrupt.

19. A video signal receiver according to claim 18, wherein the second processing operation further comprises updating a database used during the first processing operation.

20. A video signal receiver according to claim 18, wherein the first interrupt has a priority lower than that of interrupts corresponding to processing operations having a duration less than about 1 millisecond.

21. A video signal receiver according to claim 18, wherein the first and second interrupts have consecutive priority.

22. A video signal receiver according to claim 18, wherein the data elements comprise teletext data elements.

* * * * *